Patented Dec. 22, 1925.

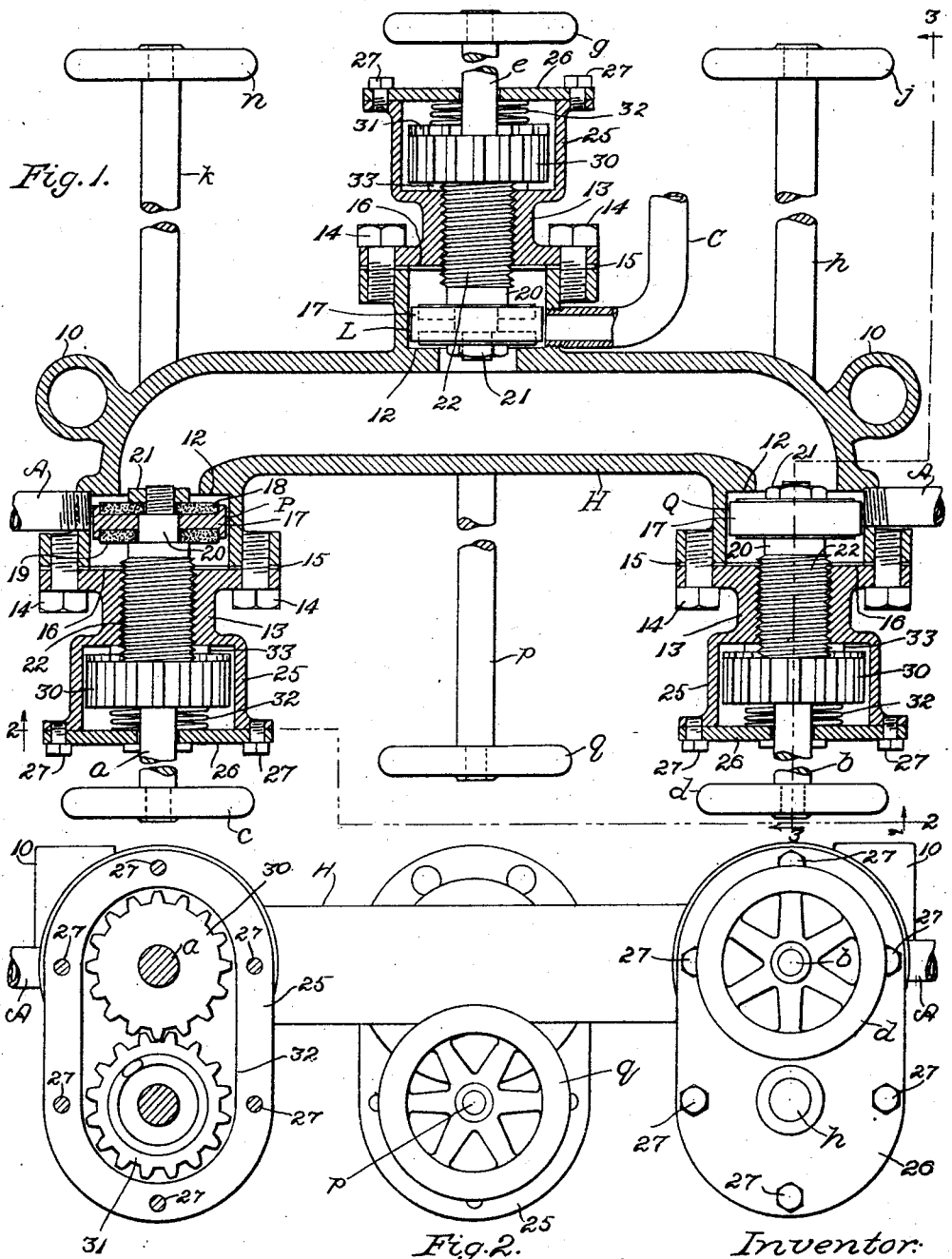

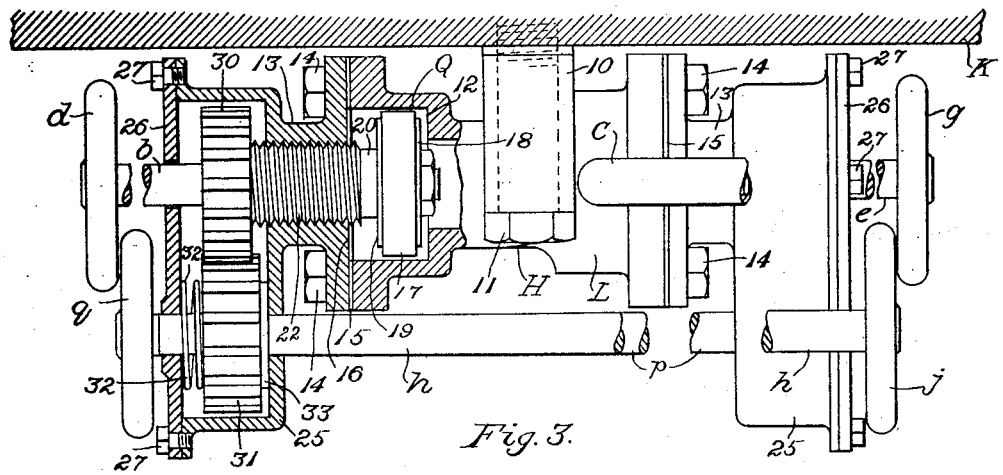
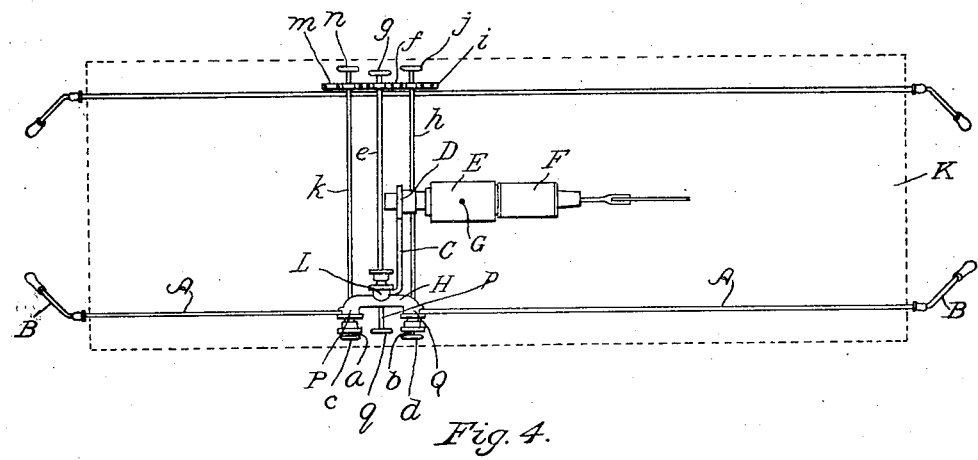

1,566,324

UNITED STATES PATENT OFFICE.

JOHN H. HANLON, OF SOMERVILLE, MASSACHUSETTS.

VALVE MECHANISM FOR AIR-BRAKE SYSTEMS.

Application filed August 1, 1923. Serial No. 655,049.

*To all whom it may concern:*

Be it known that I, JOHN H. HANLON, a citizen of the United States, residing at Somerville, county of Middlesex, Commonwealth of Massachusetts, have invented a certain new and useful Improvement in Valve Mechanism for Air-Brake Systems, of which the following is a specification, reference being had therein to the accompanying drawings.

This invention relates to air brake systems for railway cars. In such systems, as at present generally in use, each car has extending longitudinally thereof an air pipe provided at its ends with suitable hose couplings whereby it may be connected with the similar pipes of contiguous cars to form a continuous train pipe, said air pipe communicating intermediate the ends of the car, through a branch pipe, with the air brake mechanism on the car, said communication being controlled by a manually operated valve, and other manually operated valves being provided in opposite sides of said first named valve to control the flow of air through and the air pressure in said pipe. The valve which controls communication with the air brake mechanism is usually located beneath the car, while the other valves are located at the ends of the car, thereby making it necessary to go under or between the cars in order to operate the valves and resulting in frequent accidents and serious injuries to the trainmen. Moreover, the valves usually employed for these purposes are of the conical plug type which are difficult to lubricate and which consequently stick and become worn, resulting in leakage which seriously interferes with the proper and efficient operation of the train, as will be familiar to those skilled in the art. Furthermore, these plug valves in cold weather frequently "freeze", or become bound by the contraction of their casings, requiring the application of a torch to release them, this practice resulting in a further leaky condition of the valves. The mounting of these valves is also such that the vibration of the train tends to loosen their parts, thereby further aggravating the difficulties resulting from leakage.

The present invention has for its object to provide a valve fitting for use for the purposes above referred to which will obviate the difficulties mentioned, said fitting being provided with valves requiring no lubrication other than such as can be readily effected, which are immune from sticking, "freezing", and leakage, which are not affected by vibration, and each of which can be readily operated from either side of the car, thereby obviating all necessity of going beneath, between, or around the cars.

The foregoing and other objects of the invention, together with the means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practiced without departure from its spirit and scope.

In said drawings:

Fig. 1 is a horizontal section of an air brake valve fitting constructed and arranged in accordance with the invention.

Figs. 2 and 3 are sections taken substantially on the lines 2—2 and 3—3, respectively, Fig. 1.

Fig. 4 is a digrammatic bottom plan view of a railway car equipped with valve mechanism embodying the invention and illustrating the relation of the latter to the other parts of the system.

Referring to Fig. 4, at K is represented the bottom of a railway car having a longitudinal air pipe A provided at its ends with hose couplings B and communicating intermediate its ends through a pipe C with the triple valve D and through the triple valve with the auxiliary air reservoir E. At F is shown a brake cylinder and at G the release valve from the auxiliary reservoir. The branch pipe C communicates with the train pipe A through a casing H having at its ends valve chambers P and Q respectively communicating with the ends of contiguous portions of the pipe A, and intermediate its ends, a valve chamber L communicating with the pipe C. The casing H is formed with ears or perforated lugs 10 (see Figs. 1, 2 and 3) by which said casing may be rigidly secured to the under side of the car K, as by bolts 11 (Fig. 3). The valve chambers L, P and Q are cylindrical in form, the pipes A and C communicating therewith through the sides thereof adjacent the end which is in communication with the body of the casing H, and within each of said chambers is a reciprocating valve, all of said valves being substantially alike so that a description of one will be sufficient for all.

Each of the valve chambers L, P and Q has formed at its end adjacent the communicating pipe A or C an inner valve seat 12, the opposite end of said chamber being closed by a bonnet 13 secured thereto by bolts 14, and between which and the end of the chamber is interposed a preferably lead gasket 15, the adjacent end of said bonnet forming an outer valve seat 16 opposite the valve seat 12. Each of the valves comprises a cylindrical head 17 substantially fitting the chamber, between the wall of which and said head a slight clearance is, however, provided. On the opposite sides of the head 17 are washers 18 and 19 composed of suitable packing material, such as oil saturated leather, and adapted to cooperate with the valve seats 12 and 16 respectively. The valve head 17 and washers 18 and 19 are carried by a coaxial stem 20 to which they are secured by a nut 21, said stem having a threaded portion 22 in relatively loose threaded engagement with the bonnet B so that rotation of the stem will cause the valve to move in opposite directions and engage the seats 12 and 16, respectively.

In the drawings, the valves are shown in their intermediate positions in which the system will be exhausted by leakage past the valve heads 17 and around the loosely fitted threaded portions 22 of the valve stems. When either valve is in engagement with the seat 12, communication between the casing H and the corresponding pipe A or C is closed, and the pressure from said pipe exhausted by leakage around the valve head and stem. When either of said valves is in engagement with its seat 16, communication is established between the casing H and the pipe A or C, and leakage about the valve stem prevented. The valve head 17 fits the valve chamber relatively closely, just enough clearance being provided for the leakage above referred to, thereby preventing dirt and scale in the system from passing around said valve to the valve seat 22. The valve seat 12 is kept clean of dirt or scale by the rush of air thereover to and from the pipe A or C. It will be seen that the threaded stem 22 permits the valve to be forced against either seat with any degree of pressure necessary and also makes it possible to open the same with any necessary degree of force should there be a tendency to stick. Moreover, there is no possibility of "freezing", while lubrication can be readily effected, or if lacking produces no serious results.

The outer end of each of the bonnets 13 is enlarged to form a gear casing 25 which is closed at its outer side by a cover plate 26 secured thereto by screws 27. The stems of the valves in the chambers P and Q are extended through the cover plates 26, as indicated at $a$ and $b$, to the adjacent side of the car, where they are provided with hand wheels $c$ and $d$ whereby said valves may be conveniently operated from that side of the car. The stem $e$ of the valve in the chamber L, which chamber is located at the opposite side of the casing H from the chamber Q, is extended to the opposite side of the car, where it is journalled in a suitable bearing $f$ (see Fig. 4) and provided with a hand wheel $g$ corresponding to the hand wheel $c$ and $d$. In order to permit operation of the valves from the sides of the car opposite that to which the stems extend, the following mechanism is provided.

Each of the valve stem portions $a$, $b$, and $e$ has fast thereon within the corresponding gear casing 25 a gear 30 which meshes with a gear 31 also located in said casing. Interposed between each gear 31 and the cover plate 26 is a spring 32 which presses the gear toward the bottom of the casing 25 and between which and the gear is interposed a friction washer 33. The spring 32 serves to hold the parts sufficiently tight to prevent the valve from being moved by the vibration of the car. The gear 31 which meshes with the gear 30 on the valve stem portion $b$ is carried by the shaft $h$ which is journalled in the gear casing 25 and the cover plate 26, extends across the bottom of the car, is journalled in a bearing $i$ at the opposite side of the latter, and is provided at the side of said bearing with a hand wheel $j$. Similarly, the gear 31 which meshes with the gear 30 on the valve stem portion $a$ is carried by a shaft $k$ which extends across the car, is journalled in a bearing $m$, and is provided with a hand wheel $n$. The gear 31 which meshes with the gear 30 on the valve stem $e$ is carried by a shaft $p$ which is journalled in the corresponding gear casing 25 and cover plate 26, extends toward that side of the car at which the hand wheels $c$ and $d$ are located and is provided with a hand wheel $q$.

From the foregoing, it will be seen that by manipulation of the proper hand wheels $c$, $d$, $g$, $j$, $m$, or $q$, all of which are located in convenient positions at the sides of the car, any of the valves in the chambers, L, P, or Q may be operated in either direction from either side of the car.

It will also be seen that when any of the valves is unseated from its outer seat 16, the pipe A or C communicating with the corresponding valve chamber will be exhausted by leakage about the valve head and stem, as above explained. It therefore follows that no valve can be so manipulated as to cut off any portion of the train from the main reservoir without applying the brakes at least on all cars at the rear of the point of cut off, thereby obviating an additional difficulty encountered in the operation of air brake systems as at present arranged and wherein it is possible, either by accident or by the meddling of unauthorized persons, so to cut off a car or a portion of a train as to trap the air in the corresponding portion of the train and prevent the application of the brakes on said car or train portion.

It will further be seen that the valve which controls the branch pipe C is immediately associated with the train pipe A, the valve chamber L being an integral part of the casing H which is connected in the train pipe A so as to constitute a part of the latter also. In air brake systems of this type as heretofore organized, the valve for controlling the branch pipe is located somewhere along the branch pipe between the train pipe and the brake mechanism. The branch pipe frequently breaks under the vibration incidental to operation, the break usually taking place at the point of connection of the branch pipe with the train pipe, i. e., between the train pipe and the valve controlling the branch pipe, and there is consequently no way of preventing the discharge of air from the system except by closing the train pipe valves. When this occurs, the brakes on the car in question must be cut out entirely and the car placed at the end of the train; the most dangerous position for a car operating without brakes. In a system embodying the prevent invention, no breakage of the branch pipe can occur between its controlling valve and the train pipe, since the former is immediately associated with the latter, so that should a branch pipe break, the valve in the chamber L can be closed and the car left in its initial position in the train.

It will furthermore be seen that, in addition to the advantages heretofore pointed out, a system embodying the present invention, and in which the valves are located adjacent the center instead of at the ends of the car, is capable also of the advantageous operation, more fully explained in my prior Letters Patent No. 1,426,061, granted August 15, 1922, and in accordance with which a car having a broken train pipe need not be placed at the end of the train and operated without brakes, as is the case in systems theretofore generally in use, but may retain its position in the train without interference with the operation of the brakes on the cars at the rear thereof or even, under certain circumstances, with that of the brakes on the defective car itself. These and other advantages of the invention will, however, be apparent to those skilled in the art without further discussion in detail.

Having thus described my invention, I claim:

1. In an air brake system, the combination with the train pipe and the branch pipe leading to the air brake mechanism, of a reciprocating valve for controlling communication between said train pipe and branch pipe, and a pair of reciprocating valves at opposite sides respectively of said first named valve for controlling the flow of air through said train pipe.

2. In an air brake system, a valve fitting comprising a casing having means for attachment to the under side of a railway car, said casing having at its ends communication with contiguous portions of the train pipe and intermediate its ends communication with the branch pipe leading to the air brake mechanism on the car, and a plurality of valves carried by said casing for controlling respectively communication between the respective ends of said casing and said train pipe portions and between the intermediate portion of said casing and said branch pipe.

3. In an air brake system, the combination with the train pipe and the branch pipe leading to the air brake mechanism, of a valve fitting comprising a casing having means for attachment to the under side of a car, said casing having at its ends valve chambers communicating respectively with contiguous portions of said train pipe and having intermediate its ends a third valve chamber communicating with said branch pipe, said valve chambers having valve seats, and reciprocating valves in said chambers, respectively, cooperating with the valve seats thereof.

4. In an air brake system, a valve fitting comprising a casing having a valve chamber provided with oppositely disposed valve seats, an air pipe communicating with said chamber between said seats, and a reciprocating valve movable in opposite directions in said chamber to engage said seats respectively.

5. In an air brake system, a valve fitting comprising a casing having a valve chamber provided with oppositely disposed valve seats, an air pipe communicating with said chamber between said seats, and a reciprocating valve movable in opposite directions in said chamber to engage said seats repectively, said valve comprising a head and packing washers secured to the opposite sides of said head.

6. In an air brake system, a valve fitting comprising a casing having a valve chamber provided with oppositely disposed inner and outer valve seats, an air pipe communicating with said chamber adjacent said inner valve seat, and a reciprocating valve movable in opposite directions in said chamber to engage said seats respectively, said valve substantially fitting said chamber but having sufficient clearance thereabout to permit leakage of air thereby.

7. In an air brake system, a valve fitting comprising a casing secured to the under side of the car and having a valve chamber provided with an inner valve seat, a bonnet secured to the outer side of said casing and providing an outer valve seat, an air pipe communicating with said chamber between said seat, and a reciprocating valve movable in opposite directions in said chamber to engage said seats respectively, said valve having a stem in threaded engagement with said bonnet.

8. In an air brake system for railway cars, a valve fitting comprising a casing secured to the under side of the car and having a valve chamber provided with an inner valve seat, a bonnet secured to the outer side of said casing and providing an outer valve seat, an air pipe communicating with said chamber between said seats, and a reciprocating valve movable in opposite directions in said chamber to engage said seats respectively, said valve having a stem in threaded engagement with said bonnet and extended to the side of the car.

9. In an air brake system, a valve fitting comprising a casing having a valve chamber provided with an inner valve seat, a bonnet secured to the outer side of said casing and providing an outer valve seat, an air pipe communicating with said chamber adjacent said inner seat, and a reciprocating valve having a stem and movable in opposite directions in said chamber to engage said seats respectively, said valve substantially fitting said chamber but having sufficient clearance thereabout to permit leakage of air thereby, and said stem having a sufficiently loose threaded engagement with said bonnet to permit leakage of air therearound.

10. In an air brake system for railway cars, the combination with a train pipe and a branch pipe leading to the air brake mechanism on the car, of a reciprocating valve for controlling communication between said train pipe and branch pipe, and mechanism operable from either side of the car for operating said valve.

11. In an air brake system for railway cars, the combination with a train pipe and a branch pipe leading to the air brake mechanism on the car, of a valve for controlling the flow of air through said train pipe, a valve for controlling communication between said train pipe and branch pipe, and mechanisms each operable from either side of the car for operating said valves respectively.

12. In an air brake system for railway cars, the combination with a train pipe and a branch pipe leading to the air brake mechanism on the car, of a reciprocating valve for controlling communication between said train pipe and branch pipe, a pair of reciprocating valves at opposite sides respectively of said first named valve for controlling the flow of air through said train pipe, and mechanisms each operable from either side of the car for operating said valves respectively.

13. In an air brake system for railway cars, the combination with a train pipe and a branch pipe leading to the air brake mechanism on the car, of a casing secured to the under side of the car, said casing communicating at its ends with contiguous portions of said train pipe and intermediate its ends with said branch pipe, a plurality of valves carried by said casing for controlling respectively communication between the respective ends of said casing and said train pipe portions and between the intermediate portion of said casing and said branch pipe, and mechanisms each operable from either side of the car for operating said valves respectively.

14. In an air brake system for railway cars, an air valve on the under side of the car and having an operating stem extended to one side of the car, a shaft operatively connected with said stem and extended to the opposite side of the car, and operating devices at opposite sides of the car for said stem and shaft respectively whereby said valve may be operated from either side of the car.

15. In an air brake system for railway cars, the combination with a train pipe and a branch pipe leading to the air brake mechanism on a car, of a valve for controlling the flow of air through said train pipe, a valve for controlling communication between said train pipe and branch pipe, each of said valves having an operating stem extended to one side of the car, a shaft operatively connected with each of said stems and extended to the side of the car opposite that to which the corresponding valve stem extends, and operating devices at the sides of the car for each of said stems and shafts, whereby any of said valves may be operated from either side of the car.

16. In an air brake system for railway cars, the combination with a train pipe, of a casing on the under side of the car with which contiguous portions of said train pipe communicate, said casing having an inner valve seat, a bonnet secured to said casing and providing an outer valve seat, said bonnet having a chambered outer end constituting a gear case, a cover for said gear case, a reciprocating valve movable in opposite directions to engage said valve seats respectively, said valve having a stem in threaded engagement with said bonnet and extending through said gear case and cover to the side of the car, a shaft parallel to said stem and extending to the opposite side of the car, intermeshing gears on said stem and shaft respectively within said gear case, and operating devices carried by said stem and shaft respectively at opposite sides of the car whereby said valve may be operated from either side of the car.

17. In an air brake system for railway cars, a reciprocating air valve on the car, a valve bonnet, said valve having a stem in threaded engagement with said bonnet, and a spring for preventing movement of said valve by the vibration of the car.

18. In an air brake system for railway cars, a reciprocating air valve on the car, a valve bonnet having a chambered outer end constituting a gear case, said valve having a stem in threaded engagement with said bonnet, a shaft parallel to said stem, intermeshing gears on said stem and shaft respectively within said gear case, a friction washer interposed between the gear on said shaft and the adjacent wall of said gear case, and a spring for pressing said last named gear against said washer.

In testimony whereof I affix my signature.

JOHN H. HANLON.